(12) United States Patent
Hannula et al.

(10) Patent No.: US 8,903,753 B2
(45) Date of Patent: Dec. 2, 2014

(54) STEAM TURBINE PERFORMANCE TESTING

(75) Inventors: Scott Victor Hannula, Westminster, MA (US); Duncan George Watt, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 13/366,481

(22) Filed: Feb. 6, 2012

(65) Prior Publication Data

US 2013/0204816 A1   Aug. 8, 2013

(51) Int. Cl.
*G06N 3/02*   (2006.01)

(52) U.S. Cl.
USPC ............................................. 706/21; 706/23

(58) Field of Classification Search
None
See application file for complete search history.

(56) References Cited

U.S. PATENT DOCUMENTS

| | | | |
|---|---|---|---|
| 5,311,421 A * | 5/1994 | Nomura et al. | 700/37 |
| 5,925,089 A | 7/1999 | Fujime | |
| 5,954,783 A | 9/1999 | Yamaguchi et al. | |
| 6,823,675 B2 | 11/2004 | Brunell et al. | |
| 7,219,040 B2 | 5/2007 | Renou et al. | |
| 7,742,904 B2 | 6/2010 | Healy et al. | |
| 7,853,392 B2 | 12/2010 | Healey et al. | |
| 2004/0128002 A1 | 7/2004 | Frampton et al. | |
| 2005/0193739 A1 | 9/2005 | Brunell et al. | |
| 2010/0100248 A1 * | 4/2010 | Minto et al. | 700/287 |
| 2011/0088396 A1 | 4/2011 | Katz | |
| 2011/0137477 A1 | 6/2011 | Al-Mazeedi | |

FOREIGN PATENT DOCUMENTS

| | | |
|---|---|---|
| CN | 102135021 A | 7/2011 |
| EP | 2495631 A2 | 9/2012 |

OTHER PUBLICATIONS

Finck, E. "Impact of Swing Conditions on Turbine Design". 12th Turbomachinery Symposium [online]. 1983 [retrieved on Dec. 2, 2013 ]. Retrieved from the internet . <url-http://turbolab.tamu.edu/proc/turboproc/T12/T12121-128.pdf>.*

Search Report and Written Opinion from corresponding EP Application No. 13153325, dated May 28, 2013.

* cited by examiner

*Primary Examiner* — Kakali Chaki
*Assistant Examiner* — Eric Nilsson
(74) *Attorney, Agent, or Firm* — Ernest G. Cusick; Hoffman Warnick LLC

(57) ABSTRACT

A steam turbine performance testing system, including at least one computer hardware device, including a neural network created using a dynamic steam turbine thermodynamic model and preliminary data collected from a steam turbine; a network tester for testing the neural network with testing data; a current performance calculator for calculating a current performance of the steam turbine from operation data of the steam turbine; and a projected performance calculator for calculating a projected performance of the steam turbine from the current performance.

7 Claims, 3 Drawing Sheets

STEAM TURBINE PERFORMANCE TESTING

BACKGROUND OF THE INVENTION

This invention relates generally to steam turbines and more particularly to performance testing of steam turbines.

Referring to FIG. 1, a block diagram depicting a known solar power steam turbine 8 is shown. Solar power steam turbine 8 may include a concentrated solar collector 10, a steam generator 12, and a steam turbine 14. Concentrated solar collector 10 collects solar energy from the sun. Steam generator 12 uses solar energy to generate steam. Steam turbine 14 uses steam to generate electricity.

Generally, during the start up of a non-solar power steam turbine the various components of the non-solar power steam turbine may heat up at comparatively different rates. For example, the rotor of the non-solar power steam turbine heats up more slowly than the casing. A steady state is reached when the various components of the non-solar steam turbine are no longer expanding or contracting in relation to one another. Testing the performance of the non-solar steam turbine is done when the non-solar steam turbine reaches a steady state. It may take several hours of continuous operation to reach the steady state. Non-solar power steam turbines are powered by steam generated from a continuously available fuel source such as gas, coal, or nuclear and, therefore, may run a sufficient length of time to reach the steady state. Due to the unreliable availability of solar energy, solar power steam turbine 8 may not be able to run continuously for the number of hours required to reach a steady state. As a result, solar power steam turbine 8 may not reach the steady state for conventional performance testing.

BRIEF DESCRIPTION OF THE INVENTION

Embodiments of the invention include systems, methods, and computer program products for steam turbine performance testing.

A first aspect of the invention includes a steam turbine performance testing system, comprising: at least one computer hardware device including: a neural network created using a dynamic steam turbine thermodynamic model and preliminary data collected from a steam turbine; a network tester for testing the neural network with testing data; a current performance calculator for calculating a current performance of the steam turbine from operation data of the steam turbine; and a projected performance calculator for calculating a projected performance of the steam turbine from the current performance.

A second aspect of the invention includes a method, comprising: collecting, using a computer hardware device, data from at least one cycle of operation of a steam turbine; creating, using the computer hardware device, a neural network from the collected data using a dynamic steam turbine thermodynamic model; testing, using the computer hardware device, the neural network using a set of testing data; collecting, using the computer hardware device, operational data from the steam turbine; and using the dynamic steam turbine thermodynamic model on the neural network to: calculate, using the computer hardware device, a current performance of the steam turbine; and calculate, using the computer hardware device, a projected performance of the steam turbine.

A third aspect of the invention includes a computer program product comprising program code embodied in at least one computer-readable storage medium, which when executed, enables a computer system to implement a method, the method comprising: collecting data from at least one cycle of operation of a steam turbine; creating a neural network from the collected data using a dynamic steam turbine thermodynamic model; testing the neural network using a set of testing data; collecting operational data from the steam turbine; and using the dynamic steam turbine thermodynamic model on the neural network to: calculate a current performance of the steam turbine; and calculate a projected performance of the steam turbine.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
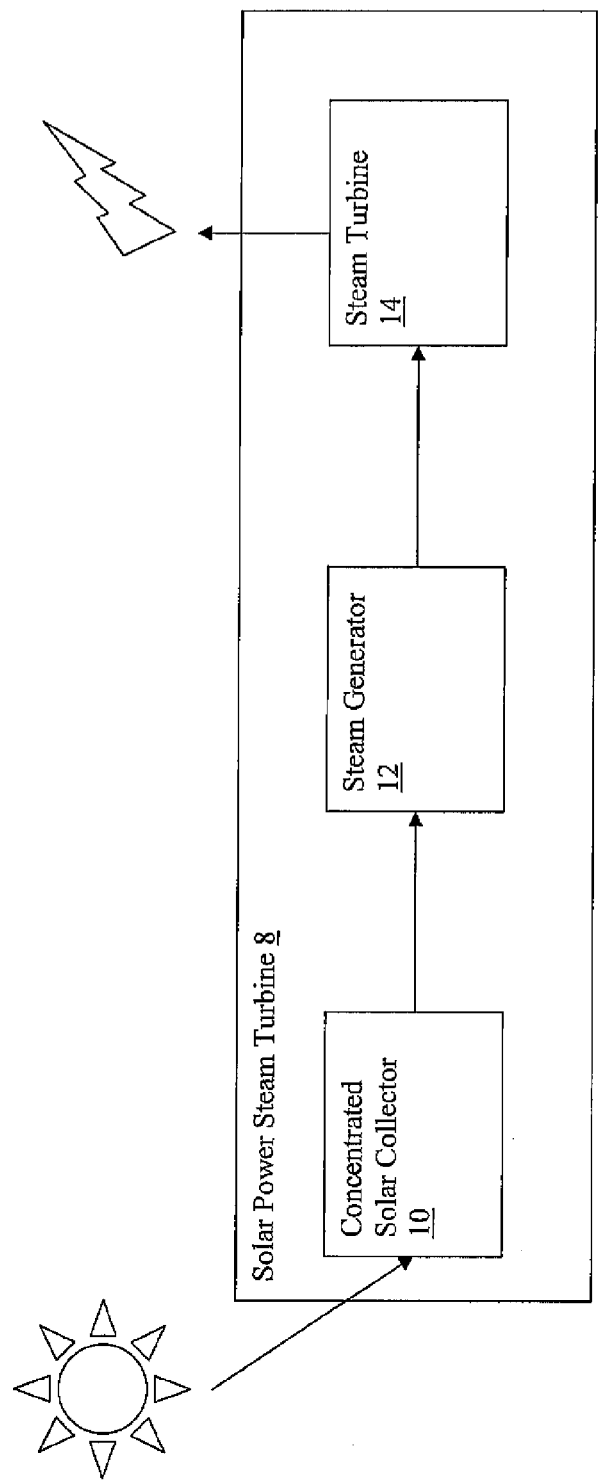
FIG. 1 shows a block diagram depicting a portion of a known solar power steam turbine.
Figure 2:
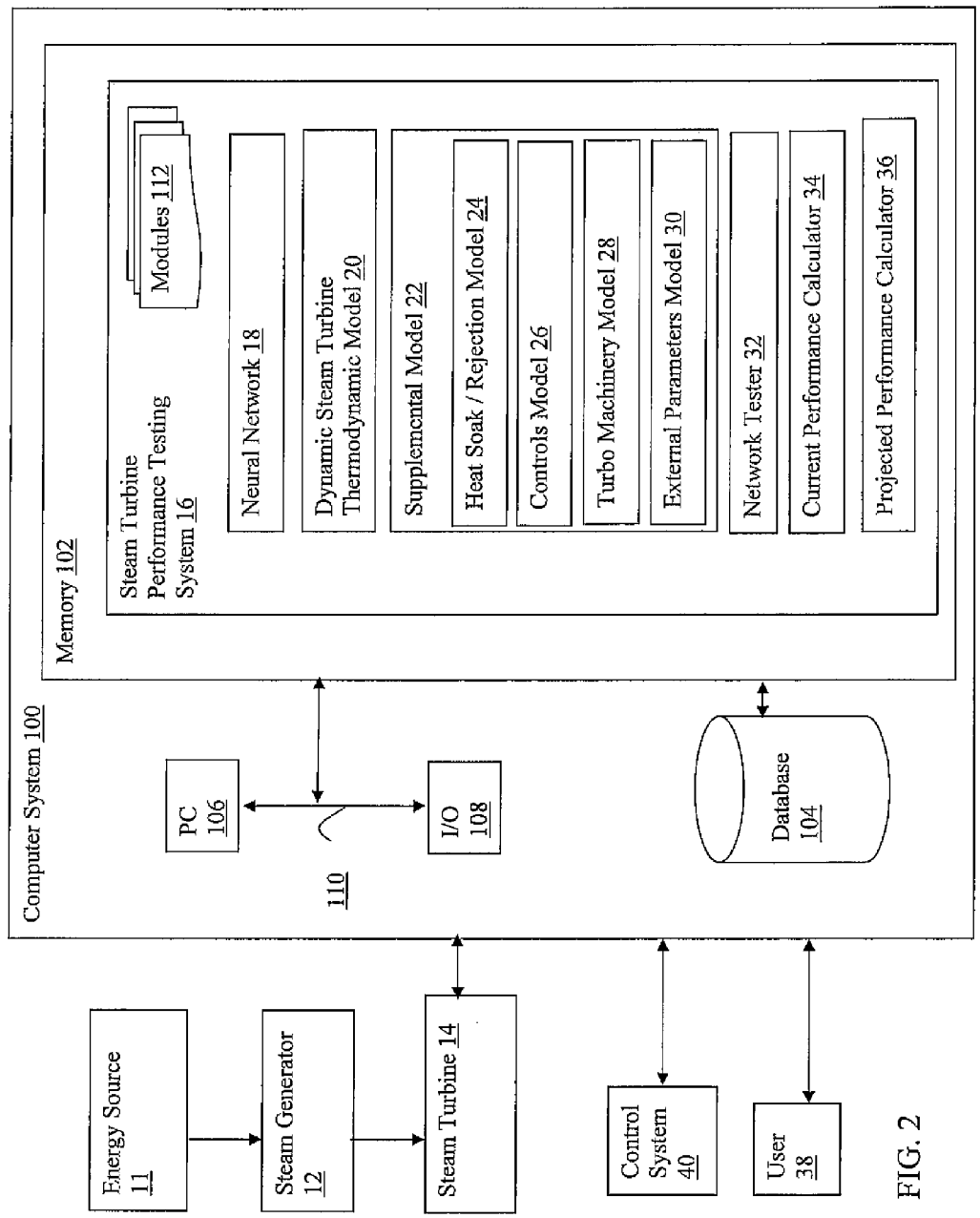
FIG. 2 shows a block diagram depicting a steam turbine performance testing system in accordance with one embodiment of the invention.

Aspects of the invention allow for performance testing of a steam turbine 14. Referring to FIG. 2 a block diagram depicting a steam turbine performance testing system 16 in accordance with one embodiment of the invention is shown. In FIG. 2, steam turbine performance testing system 16 communicates with steam turbine 14 as previously described with respect to FIG. 1. Steam turbine 14 may be solar powered or non-solar powered. Steam turbine 14 receives steam from steam generator 12. Steam generator 12 generates steam using an energy source 11. Energy source may be solar powered or non-solar powered. Non-solar power may include fuel sources such as gas, coal, nuclear, or any other known or to be developed fuel source. Steam turbine processing system 16 may include a neural network 18. The neural network 18 may be created by using a dynamic steam turbine thermodynamic model 20 that receives preliminary data from the steam turbine 14. The creating by using the dynamic steam turbine thermodynamic model 20 may be supplemented by using a supplemental model 22. The supplemental model may include at least one of a heat soak rejection model 24, a controls model 26, a turbo machinery model 28, and an external parameters model 30

In FIG. 2, steam turbine 14 is shown in communication with computer system 100. Computer system 100 may include steam turbine performance testing system 16, which makes computer system 100 operable for performance testing of steam turbine 14. As indicated in FIG. 2, the neural network 18, the dynamic steam turbine thermodynamic model 20, a supplemental model 22, a network tester 32, a current performance calculator 34, and a projection performance calculator 36 may be optional components (or, modules) in steam turbine performance testing system 16. Further, the supplemental model 22 may include one or more of the heat soak/rejection model 24, the controls model 26, the turbo machinery model 28, and the external parameters model 30 all of which may be optional components (or, modules) in steam turbine performance testing system 16. Alternatively, the neural network 18, the dynamic steam turbine thermodynamic model 20, the dynamic steam turbine thermodynamic model 22, the heat soak/rejection model 24, the controls model 26, the turbo machinery model 28, the external parameters model 30, the network tester 32, the current performance calculator 34, and the projection performance calculator 36 may be part of an external system which may perform the functions described herein.

Figure 3:
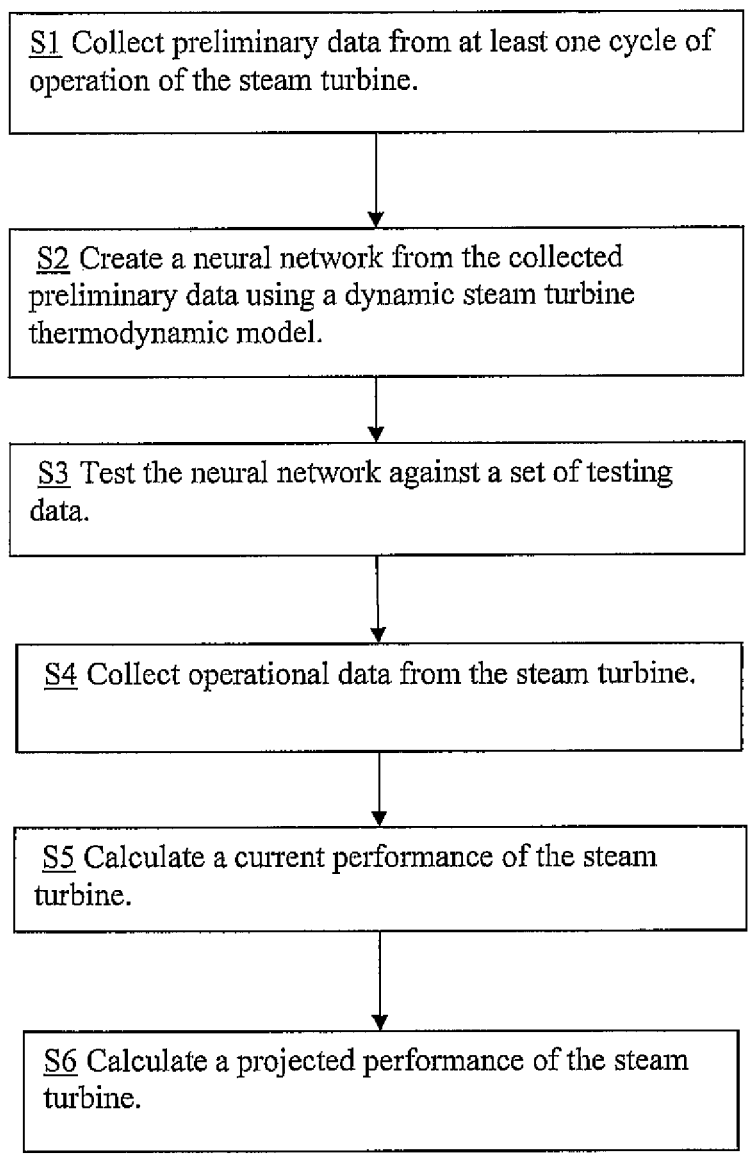
FIG. 3 shows a flow diagram representing an embodiment of a method of steam turbine performance testing.

Continuing to refer to FIG. 2 and also referring to FIG. 3, a flow diagram representing an embodiment of a method of steam turbine performance testing is illustrated. At process S1, steam turbine performance testing system 16 may collect preliminary data from at least one cycle of operation of the steam turbine 14. Preliminary data may include pressure measurements (for example steam admission pressure, condenser pressure, and extraction pressure), temperature measurements (for example steam admission temperature, condenser temperature, and extraction pressure), mechanical measurements (for example speed, vibration levels, and proximity), and inferred/calculated measurements (for example flow, power, and frequency). A person skilled in the art will recognize that each of these examples is not exhaustive and other data concerning the operation of the steam turbine 14 might be used in the practice of the present invention. At process S2, steam turbine performance testing system 16 creates the neural network 18 from the preliminary data using the dynamic steam turbine thermodynamic model 20. The creating may be supplemented by the supplemental model 22 and may include at least one of the heat soak/rejection model 24, the controls model 26, the turbo machinery model 28, and the external parameters model 30. A person skilled in the art will recognize the neural network 18 as a component for modeling performance, in this case the performance of the steam turbine 14. Neural network 18 is well known in the art. Neural network 18 may include any known or to be developed neural network 18.

Dynamic steam turbine thermodynamic model 20 models a power generation for the steam turbine 14 using parameters including enthalpy, entropy, and pressure, volume, and density of steam entering and exiting the steam turbine 14. Dynamic steam turbine thermodynamic model 20 may include a flexible steam turbine thermodynamic model and/or a transient steam turbine thermodynamic model. Flexible steam turbine thermodynamic model may allow for variation of a thermodynamic definition of the steam turbine 14, for example, by modifying parameters including, for example, stage efficiencies, section efficiencies, pressure variations, temperature variations, and mechanical losses. Transient steam turbine thermodynamic model may include elements of the flexible steam turbine thermodynamic model and may further allow for a time dependent change in a state of the transient steam turbine thermodynamic model in response to, for example, control system reaction times, heat rejection or absorption characteristics, unbalanced torques, and volume/manifold dynamics.

Inputs to the flexible steam turbine thermodynamic model 20 may include fluid properties, steam properties, pressures, temperatures, flows, speeds, and power. Outputs of the flexible steam turbine thermodynamic model may include internal calculated parameters including efficiencies, stage powers, intermediate stage temperatures, and pressures. A person skilled in the art will readily recognize additional inputs and outputs of the flexible steam turbine thermodynamic model.

Inputs to the transient steam turbine thermodynamic model may include fluid properties, steam properties, pressures, temperatures, flows, speeds, accelerations, and power. Outputs of the transient steam turbine thermodynamic model may include internal calculated parameters including efficiencies, stage powers, intermediate stage temperatures, and pressures, energy transfers, and heat transfers. A person skilled in the art will readily recognize additional inputs and outputs of the transient steam turbine thermodynamic model.

Heat soak rejection model 24 models heat gain and heat loss in the steam turbine 14, for example, an amount of heat from at least one of a heat decrease as the steam turbine 14 cools down and a heat increase as the steam turbine 14 heats up. Inputs to the heat soak rejection model 24 may include fluid properties, steam properties, flow path temperatures, metal temperatures, flows, materials, materials mass, conduction coefficients, convection coefficients, and radiation coefficients. Outputs of the heat soak rejection model 24 may include heat transfer rates and metal temperature changes. A person skilled in the art will readily recognize additional measures of heat gain and heat loss in the steam turbine 14.

Controls model 26 models at least one control of the steam turbine 14. Inputs to the controls model 26 may include times, speeds, accelerations, pressures, temperatures, flows and power outputs. Outputs of the controls model 26 may include valve positions and fuel adjustment modifiers. A person skilled in the art will readily recognize additional controls of the steam turbine 14.

Turbo machinery model 28 models at least one dynamic vector of the steam turbine 14 using parameters including blade entrance angle, blade exit angle, blade velocity, steam entrance angle, steam exit angle, steam entrance velocity, steam exit velocity, Inputs to the turbo machinery model 28 may include fluid properties, steam properties, pressures, temperatures, turbine component models, turbine component maps, flows, speeds, accelerations, and power. Outputs of the turbo machinery model 28 may include updated efficiencies and adjusted efficiencies. A person skilled in the art will readily recognize additional controls of the steam turbine 14.

External parameters model 30 models at least one external operating parameter of the steam turbine 14. Inputs to the external parameters model 30 may include fluid properties, steam properties, ambient conditions, steam turbine parameters, and plant operational information. Outputs of the external parameters model 30 may include control parameters, temperatures, pressures, and flows. A person skilled in the art will readily recognize additional controls of the steam turbine 14.

At process S3, network tester 32 tests the neural network 18 using testing data. Testing data may include pressure data (for example steam admission pressure, condenser pressure, and extraction pressure), temperature data (for example steam admission temperature, condenser temperature, and extraction pressure), mechanical data (for example speed, vibration levels, and proximity), and inferred/calculated data (for example flow, power, and frequency). The testing data may be pre-set for purposes of testing the neural network 18. A person skilled in the art will recognize that each of these examples is not exhaustive and other data concerning the operation of the steam turbine 14 might be used.

At process S4, steam turbine performance testing system 16 collects operational data of the steam turbine 14. Operational data of the steam turbine 14 may be collected after the steam turbine 14 is operationally deployed, for example, delivered to a customer. Operational data may include pressure measurements (for example steam admission pressure, condenser pressure, and extraction pressure), temperature measurements (for example steam admission temperature, condenser temperature, and extraction pressure), mechanical measurements (for example speed, vibration levels, and proximity), and inferred/calculated measurements (for example flow, power, and frequency). A person skilled in the art will recognize that each of these examples is not exhaustive and other data concerning the operation of the steam turbine 14 might be used.

At process S5, current performance calculator 32 calculates a current performance of steam turbine 14. Current performance is calculated from the operational data. Current performance includes a fuel flow input, a power output, efficiencies, a heat rate, etc. A person skilled in the art will readily recognize additional indicators of current performance of the steam turbine 14 may be calculated from operational data.

At process S6, projected performance calculator 34 calculates a projected performance of steam turbine 14 from the current performance. In addition to current performance, projected performance calculation may also include adjusting any operational variable to project performance of the steam turbine 14. Including adjusted operational variables may result in determining optimized performance settings, projected performance under stress conditions, or other related projected scenarios. A guarantee point may be a level of performance of steam turbine 14 that a customer has contracted. Projected performance may be based upon the guarantee point.

User 38 and/or control system 40 may receive results of calculating current performance and projection performance of steam turbine 14. User 38 and/or control system 40 may interact with computer system 100, and/or steam turbine 14 in response to receiving results.

Computer system 100 is shown in communication with a user 38. A user 38 may be, for example, a programmer or operator. Additionally, computer system 100 is shown in communication with a control system 40. Control system 40 may be, for example, a computerized control system for steam turbine 14. Computer system 100 is shown including a processing component 106 (e.g., one or more processors), a database 104, a memory 102, an input/output (I/O) component 108 (e.g., one or more I/O interfaces and/or devices), and a communications pathway 110. In one embodiment, processing component 106 executes program code, such as steam turbine performance testing system 16, which is at least partially embodied in memory 102. While executing program code, processing component 106 can process data, which can result in reading and/or writing the data to/from database 104, memory 102 and/or I/O component 108 for further processing. Communications pathway 110 provides a communications link between each of the components in computer system 100. I/O component 108 can comprise one or more human I/O devices or storage devices, which enable user 38 and/or control system 40 to interact with computer system 100 and/or one or more communications devices to enable user 38 and/or control system 40 to communicate with computer system 100 using any type of communications link. To this extent, steam turbine performance testing system 16 can manage a set of interfaces (e.g., graphical user interface(s), application program interface, and/or the like) that enable human and/or system interaction with steam turbine performance testing system 16.

Computer system 100 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction to a different material form; and/or (c) decompression. To this extent, steam turbine performance testing system 16 can be embodied as any combination of system software and/or application software. In any event, the technical effect of steam turbine performance testing system 16 is to test the performance of steam turbine 14.

Further, steam turbine performance testing system 16 can be implemented using a set of modules 112. In this case, a module 112 can enable computer system 100 to perform a set of tasks used by steam turbine performance testing system 16, and can be separately developed and/or implemented apart from other portions of steam turbine performance testing system 16. Steam turbine performance testing system 16 may include modules 112 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computer system 100.

When computer system 100 comprises multiple computing devices, each computing device may have only a portion of steam turbine performance testing system 16 embodied thereon (e.g., one or more modules 112). However, it is understood that computer system 100 and steam turbine performance testing system 16 are only representative of various possible equivalent computer systems that may perform a process described herein. To this extent, in other embodiments, the functionality provided by computer system 100 and steam turbine performance testing system 16 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 100 includes multiple computing devices, the computing devices can communicate over any type of communications link. Further, while performing a process described herein, computer system 100 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, steam turbine performance testing system 16 enables computer system 100 to test the performance of steam turbine 14. Steam turbine performance testing system 16 may include logic, which may include the following functions: creating, testing, collecting, and calculating. In one embodiment, steam turbine performance testing system 16 may include logic to perform the herein-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, steam turbine performance testing system 16 and logic included therein will be described herein as a specific use machine. As will be understood from the description, while logic is illustrated as including each of the above-stated functions, not all of the functions are necessary according to the teachings of the invention as recited in the appended claims.

In one embodiment, the invention provides a computer program embodied in at least one computer-readable storage medium, which when executed, enables a computer system (e.g., computer system 100) to test the performance of steam turbine 14. To this extent, the computer-readable storage medium includes program code, such as steam turbine performance testing system 16, which implements some or all of a process described herein. It is understood that the term "computer-readable storage medium" comprises one or more of any type of tangible medium of expression capable of embodying a copy of the program code (e.g., a physical embodiment). For example, the computer-readable storage medium can comprise: one or more portable storage articles of manufacture; one or more memory/storage components of a computing device; paper; and/or the like. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

In another embodiment, the invention provides a method of providing a copy of program code, such as steam turbine performance testing system 16, which implements some or all of a process described herein. In this case, a computer system can generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program embodied in at least one computer-readable medium. In either case, the set of data signals can be transmitted/received using any type of communications link.

In still another embodiment, the invention provides a method of generating a system to test the performance of steam turbine 14. In this case, a computer system, such as computer system 100, can be obtained (e.g., created, maintained, made available, etc.) and one or more modules for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing and/or I/O devices to the computer system; and (3) incorporating and/or modifying the computer system to enable it to perform a process described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, processes, operations, elements, and/or components, but do not preclude the presence or addition of one or more other features, integers, processes, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A steam turbine performance testing system, comprising:
   at least one computer hardware device including:
      a neural network created using a dynamic steam turbine thermodynamic model and preliminary data collected from a steam turbine, wherein the dynamic steam thermodynamic model allows for a variation of a thermodynamic definition of the steam turbine by modifying parameters including a stage efficiency, a section efficiency, a pressure variation, a temperature variation, and a mechanical loss, and wherein the dynamic steam turbine thermodynamic model includes a heat soak rejection model for allowing time dependent changes in the variation of the thermodynamic definition by including an amount of heat from at least one of a heat decrease as the steam turbine cools down and a heat increase as the steam turbine heats up;
      a network tester for testing the neural network with testing data;
      a current performance calculator for calculating a current performance of the steam turbine from operation data of the steam turbine; and
      a projected performance calculator for calculating a projected performance of the steam turbine from the current performance, wherein the projected performance is based upon a guarantee point.

2. The system of claim 1, wherein the heat soak rejection model models a heat gain and a heat loss in the steam turbine.

3. The system of claim 1, wherein the dynamic steam turbine thermodynamic model models a power generation for the steam turbine.

4. A method, comprising:
   collecting, using a computer hardware device, preliminary data from at least one cycle of operation of a steam turbine;
   creating, using the computer hardware device, a neural network from the collected preliminary data using a dynamic steam turbine thermodynamic model, wherein the dynamic steam thermodynamic model allows for a variation of a thermodynamic definition of the steam turbine by modifying parameters including a stage efficiency, a section efficiency, a pressure variation, a temperature variation, and a mechanical loss, and wherein the dynamic steam turbine thermodynamic model includes a heat soak rejection model for allowing time dependent changes in the variation of the thermodynamic definition by including an amount of heat from at least one of a heat decrease as the steam turbine cools down and a heat increase as the steam turbine heats up;

testing, using the computer hardware device, the neural network using a set of testing data;

collecting, using the computer hardware device, operational data from the steam turbine; and using the dynamic steam turbine thermodynamic model on the neural network to:

calculate, using the computer hardware device, a current performance of the steam turbine; and calculate, using the computer hardware device, a projected performance of the steam turbine, wherein the projected performance is based upon a guarantee point.

5. The method of claim 4, wherein the heat soak rejection model models a heat gain and a heat loss in the steam turbine.

6. The method of claim 4, wherein the dynamic steam turbine thermodynamic model measures a power generation for the steam turbine.

7. A computer program product comprising program code embodied in at least one non-transitory computer-readable storage medium, which when executed, enables a computer system to implement a method, the method comprising:

collecting preliminary data from at least one cycle of operation of a steam turbine;

creating a neural network from the collected preliminary data using a dynamic steam turbine thermodynamic model, wherein the dynamic steam thermodynamic model allows for a variation of a thermodynamic definition of the steam turbine by modifying parameters including a stage efficiency, a section efficiency, a pressure variation, a temperature variation, and a mechanical loss, and wherein the dynamic steam turbine thermodynamic model includes a heat soak rejection model for allowing time dependent changes in the variation of the thermodynamic definition by including an amount of heat from at least one of a heat decrease as the steam turbine cools down and a heat increase as the steam turbine heats up;

testing the neural network using a set of testing data;

collecting operational data from the steam turbine; and using the dynamic steam turbine thermodynamic model on the neural network to:

calculate a current performance of the steam turbine; and calculate a projected performance of the steam turbine, wherein the projected performance is based upon a guarantee point.

\* \* \* \* \*